United States Patent Office 2,832,493
Patented Apr. 29, 1958

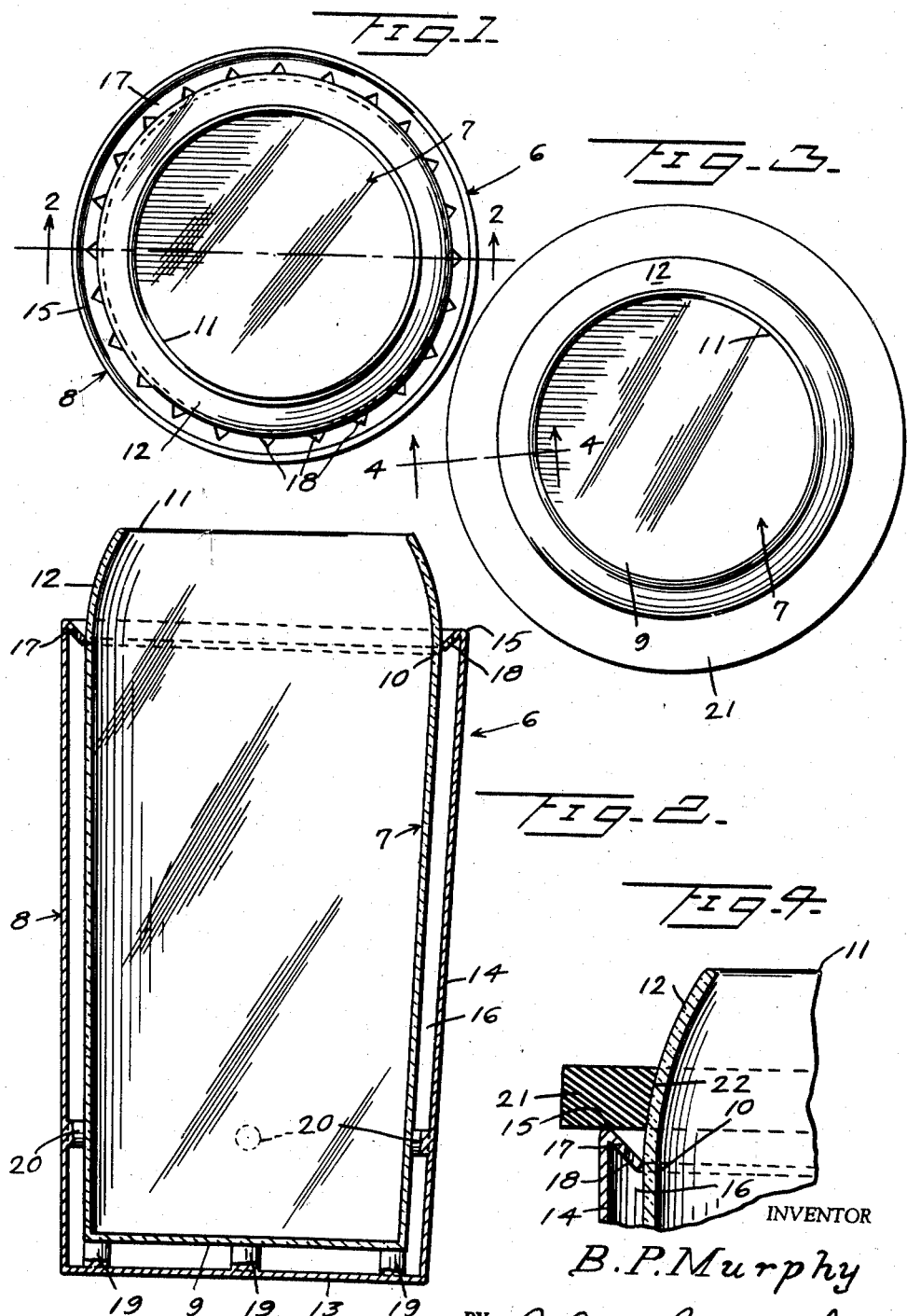

2,832,493

COMBINATION DRINKING GLASS AND HEAT INSULATING COASTER

Burl P. Murphy, Cincinnati, Ohio

Application February 29, 1956, Serial No. 568,525

2 Claims. (Cl. 215—13)

This invention relates to a novel combination drinking glass and coaster which will reduce to a minimum the accumulation of condensation on the exterior of the glass while containing an iced drink, which will prevent injury to a surface on which the glass is placed while contained in the coaster, and which due to the insulating properties of the coaster will keep cold drinks at a low temperature within the glass and will prevent the glass from absorbing heat from the hand in which it is held.

Another object of the invention is to provide an insulating coaster glass in which the glass is supported in spaced apart relation to the walls of the coaster to maintain an air chamber around the glass.

A further object of the invention is to provide a combination coaster and glass from which the glass can be readily removed for cleaning the glass and coaster separately.

A further object of the invention is to provide a combination coaster and glass having means to prevent overflowing and spilling of a liquid from the rim of the glass into the surrounding coaster.

Various other objects and advantages of the invention will hereinafter become more fully apparent from the following description of the drawing, illustrating a presently preferred embodiment thereof, and wherein:

Figure 1 is a top plan view of the combination coaster and glass;

Figure 2 is a central vertical sectional view thereof, taken substantially along a plane as indicated by the line 2—2 of Figure 1;

Figure 3 is a top plan view, similar to Figure 1, but showing the coaster glass with an attachment applied thereto to prevent overflowing of the contents of the glass into the coaster, and Figure 4 is a fragmentary vertical sectional view taken substantially along a plane as indicated by the line 4—4 of Figure 3.

Referring more specifically to the drawing, the combination drinking glass and coaster in its entirety and comprising the invention is designated generally 6 and includes a drinking glass, designated generally 7, and a coaster, designated generally 8.

The drinking glass 7 is of circular shape in cross section and progressively increases in cross sectional size slightly from the bottom 9 thereof to a point 10 located near to but spaced from the rim 11 of the glass 7. The upper portion 12 of the glass 7, located between the annular portion 10 of greatest diameter and the rim 11, is of diminishing diameter toward the rim 11 and is inwardly curved, as best seen in Figures 2 and 4.

The coaster 8, which may be formed of a lightweight metal such as aluminum or of plastic, includes a substantially flat bottom 13 which is of larger diameter than the bottom 9 of the glass. The coaster 8 includes an annular side wall 14 which increases gradually in diameter from the bottom 13 to the upper edge 15 of said coaster. The coaster wall 14 is of larger interior diameter than the exterior diameter of a complementary portion of the glass 7 to provide an air chamber 16 of substantial area between the glass and coaster wall 14. The coaster 8 also includes an annular downwardly and inwardly extending flange 17, which forms an extension of the upper portion of the wall 14 and which extends downwardly and inwardly from the upper edge or rim 15 thereof. The inner edge of the flange 17 is of a diameter to fit snugly around the annular portion 10 of the glass 7, constituting the portion thereof of greatest diameter. As best seen in Figure 1, the inner edge of the flange 17 is provided with a series of spaced notches 18 to provide a circulation of air to and from the chamber 16.

The bottom 13 of the coaster 8 is provided on its inner side with a plurality, preferably four, spacing buttons 19, which are formed integral therewith or suitably secured thereto and which extend upwardly therefrom. The side wall 14, near to but spaced from the bottom 13, is provided with four internally disposed buttons 20 which are preferably spaced equal distances apart in the same horizontal plane, as seen in Figure 2. The bottom 9 of the glass rests on the buttons 19 so that a portion of the air chamber 16 is disposed between the bottoms 9 and 13. The inner ends of the buttons 20 are in contact with portions of the wall of the glass to cooperate with the inner edge of the flange 17 to position the glass 7 substantially concentrically within the coaster 8 so that the radius of the chamber 16 will be substantially uniform around the glass.

As seen in Figures 3 and 4, a ring member or collar 21 which is of substantial radial width has a tapered bore 22 which is sized to conformably fit against a part of the glass portion 12 when said collar 21 is resting on the coaster rim 15, as seen in Figure 4. The collar 21 is applied when the glass is to be filled, especially when filled with a beverage having a tendency to foam, so that in the event of overflowing of the glass, the overflowing liquid will not enter the air chamber 16 through the notches 18. After the glass is filled and before the contents, not shown, thereof is consumed, the collar 21 is removed.

The air chamber 16 afforded by the coaster 8 will reduce to a minimum the accumulation of condensation on the exterior of the glass 7, when said glass contains chilled or iced drinks. Additionally, said air chamber will prevent any accumulation of condensation on the exterior of the coaster 8, so that said coaster may be placed upon a surface, such as a varnished surface, without risk of injury thereto. Additionally, the air chamber 16 will prevent heat from a hand grasping the coaster 8 from being conducted to the contents of the glass 7, so that the contents of the glass 7 will be maintained colder and the melting of any ice contained therein will be minimized.

The glass 7 can be slidably removed from the upper end of the coaster 8 so that the glass and coaster may be separately cleansed. The shape of the upper glass portion 12 not only minimizes the possibility of spilling from the rim 11 of the glass but additionally enables use of the collar 21 for the purpose as heretofore described and which could not be utilized if the rim 11 of the glass were not of a smaller diameter than the portion 12 located therebeneath.

Various modifications and changes are contemplated and may obviously be resorted to, without departing from the spirit or scope of the invention as hereinafter defined by the appended claims.

I claim as my invention:

1. A combination drinking glass and coaster comprising a drinking glass having a substantially flat bottom and an annular wall extending upwardly from said bottom and progressively increasing in cross sectional size to a point adjacent the rim of the glass, a coaster of rigid construction, for receiving said glass including a substantially flat bottom and an annular wall extending upwardly from said bottom and increasing progressively in cross sectional size toward an upper edge forming a rim of said coaster, said coaster being of larger cross sectional size than the glass at complementary portions thereof and having an annular flange extending downwardly and inwardly from the rim thereof, an inner edge of said flange defining an opening fitting snugly around the glass at said point thereof of largest diameter, buttons fixed to and disposed internally of the coaster bottom and annular wall and extending inwardly therefrom and engaging the bottom and annular wall of the glass, respectively, for cooperating with said flange to maintain the glass in a centered position within and spaced from the coaster bottom and side wall to provide an insulating air chamber between the glass and coaster, and said flange having a series of spaced notches opening through said inner edge thereof and forming passages for circulation of air to and from said air chamber.

2. A combination drinking glass and coaster as in claim 1, said glass including an upwardly tapered rounded upper portion extending upwardly from said point of largest diameter to the rim, and a collar formed of a sealing material of substantial thickness and of substantial radial width, said collar being detachably supported on the coaster rim around a part of the upper portion of the glass and having a tapered bore conformably fitting snugly around a part of the tapered upper portion of the glass for sealing the space between the coaster rim and glass while the glass is being filled to prevent overflow from the rim of the glass entering the air chamber through the notches of said flange.

References Cited in the file of this patent
UNITED STATES PATENTS

| | | |
|---|---|---|
| 1,128,216 | Anderson | Feb. 9, 1915 |
| 1,424,667 | Murch | Aug. 1, 1922 |
| 2,329,512 | Clifford | Sept. 14, 1943 |
| 2,419,416 | Mustain | Apr. 22, 1947 |
| 2,570,954 | Kasman | Oct. 9, 1951 |
| 2,655,281 | Davis | Oct. 13, 1953 |
| 2,706,571 | Ryan | Apr. 19, 1955 |
| 2,727,645 | Dore | Dec. 20, 1955 |

FOREIGN PATENTS

| | | |
|---|---|---|
| 733,357 | France | July 5, 1932 |
| 1,098,602 | France | Mar. 9, 1955 |